(12) United States Patent
Schäuble et al.

(10) Patent No.: US 11,588,511 B2
(45) Date of Patent: Feb. 21, 2023

(54) PLUG-IN RADIO MODULE FOR AUTOMATION ENGINEERING

(71) Applicant: Endress+Hauser SE+Co. KG, Maulburg (DE)

(72) Inventors: Harald Schäuble, Lörrach (DE); Patrice Grosperrin, Rixheim (FR)

(73) Assignee: Endress+Hauser SE+Co. KG, Maulburg (DE)

( * ) Notice: Subject to any disclaimer, the term of this patent is extended or adjusted under 35 U.S.C. 154(b) by 353 days.

(21) Appl. No.: 17/050,645

(22) PCT Filed: Apr. 17, 2019

(86) PCT No.: PCT/EP2019/059946
§ 371 (c)(1),
(2) Date: Oct. 26, 2020

(87) PCT Pub. No.: WO2019/206768
PCT Pub. Date: Oct. 31, 2019

(65) Prior Publication Data
US 2021/0067192 A1    Mar. 4, 2021

(30) Foreign Application Priority Data

Apr. 26, 2018   (DE) .................... 10 2018 110 101.5

(51) Int. Cl.
| | | |
|---|---|---|
| *H04B 1/40* | (2015.01) | |
| *G08C 17/02* | (2006.01) | |
| *G05B 19/04* | (2006.01) | |
| *G05B 19/41* | (2006.01) | |
| *G05B 19/4155* | (2006.01) | |

(52) U.S. Cl.
CPC ........... *H04B 1/40* (2013.01); *G05B 19/4155* (2013.01); *G05B 2219/31121* (2013.01)

(58) Field of Classification Search
None
See application file for complete search history.

(56) References Cited

U.S. PATENT DOCUMENTS 7,262,693 B2    8/2007  Karschnia et al.
10,868,867 B2 *  12/2020  Binder .................... H04L 67/12
(Continued)

FOREIGN PATENT DOCUMENTS

DE      102006009979 A1    9/2007
DE      102010024210 B4 *  9/2012  ....... H04L 12/40026
(Continued)

*Primary Examiner* — Pablo N Tran
(74) *Attorney, Agent, or Firm* — Mark A. Logan; Endress+Hauser (USA) Holding, Inc.

(57) ABSTRACT

Disclosed is a plug-in radio module for automation engineering for wireless data transmission, having at least a wired interface for connecting to a corresponding wired field device interface of a field device and radio module electronics having a radio antenna, wherein the radio module electronics are configured to use the wired interfaces to query at least one current value of the field device and to use the current value to adapt a paging interval and/or a radio data width for the wireless data transmission as appropriate, so that the radio module electronics perform an adapted-power mode of operation in which the wireless data transmission is matched to the power currently made available to the field device.

13 Claims, 1 Drawing Sheet

(56) References Cited

U.S. PATENT DOCUMENTS

2008/0211664 A1    9/2008   Griech et al.
2012/0002605 A1    1/2012   Yoshino et al.
2012/0326525 A1   12/2012   Sireich

FOREIGN PATENT DOCUMENTS

| DE | 102013106098 A1 | | 12/2014 | |
|----|-----------------|---|---------|---|
| DE | 102015117011 A1 | | 4/2017 | |
| DE | 102016124796 A1 | * | 6/2018 | |
| WO | WO-2009109403 A2 | * | 9/2009 | ............ G05B 19/05 |

* cited by examiner

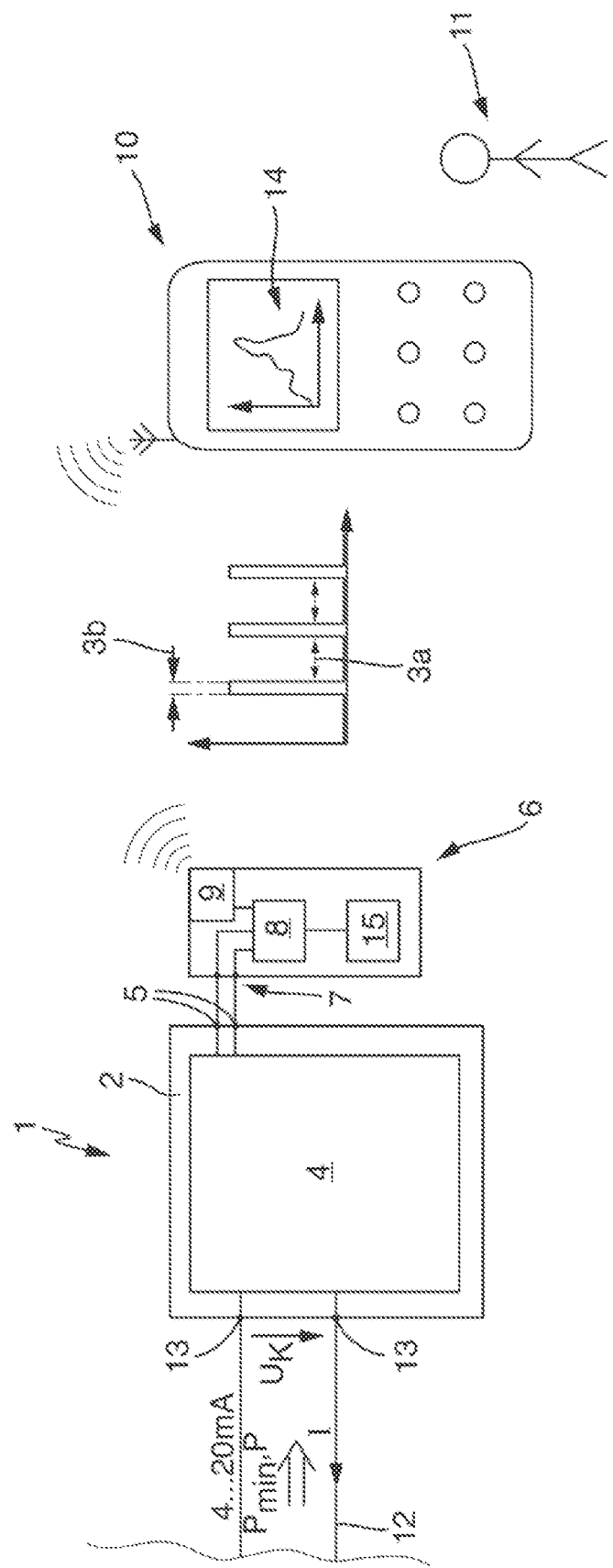

PLUG-IN RADIO MODULE FOR AUTOMATION ENGINEERING

CROSS-REFERENCE TO RELATED APPLICATIONS

The present application is related to and claims the priority benefit of German Patent Application No. 10 2018 110 101.5, filed on Apr. 26, 2018 and International Patent Application No. PCT/EP2019/059946, filed on Apr. 17, 2019, the entire contents of which are incorporated herein by reference.

TECHNICAL FIELD

The invention relates to a system of automation technology, a plug-in radio module of automation technology and a method for wireless data transmission between a mobile operating unit and a radio module plugged into the field device.

BACKGROUND

In automation technology, in particular in process automation, field devices which serve for the determination, optimization and/or influencing of process variables are widely used. Sensors, such as fill-level measuring devices, flow meters, pressure and temperature measuring devices, pressure and temperature measuring devices, conductivity measuring devices, etc., are used for capturing the respective process variables, such as fill level, flow rate, pressure, temperature and conductivity. Actuators, such as, for example, valves or pumps, are used to influence process variables. The flow rate of a fluid in a pipeline section or a filling level in a container can thus be altered by means of actuators. Field devices, in general, refer to all devices which are process-oriented and which supply or process process-relevant information. In the context of the invention, field devices also refer to remote I/Os (electrical interfaces), radio adapters and/or, in general, devices that are arranged on the field level.

A variety of such field devices are manufactured and marketed by the Endress+Hauser company.

Two-wire field devices, which are connected via a two-wire line to a higher-level unit, for example a control unit PLC, are still common at the present time in a large number of existing automation systems. Two-wire field devices are designed in such a way that measurement or control values as a main process variable are communicated, i.e. transmitted, in analog form via the two-wire line or two-wire cable as a 4-20 mA signal. In addition to their primary function, namely the generation of measured values, modern field devices have numerous further functionalities which support an efficient and reliable guidance of the process to be observed. These include, among other things, such functions as the self-monitoring of the field device, the storage of measured values, the generation of control signals for actuators, etc.

The processes observed by means of the field devices are subject to a constant modification, both with regard to the structural design of the systems and with regard to the temporal sequences of individual process steps. In a corresponding manner, the field devices must also be adapted to the changing process conditions and further developed. This extends, on the one hand, to the measurement transducers, but, on the other hand, above all to the implemented functions, such as, for example, control of the measurement transducer, evaluation of the measurement signals or presentation of the measurement results and also communication with the higher-level unit.

Due to the two-wire line, the field devices are generally limited in terms of voltage and power supply, in particular in hazardous areas.

Since power consumption is severely limited, such devices are also referred to as low-power field devices. Due to the limited power available to the field device, the power for individual components of the field device or for components which are attached to or plugged into the field device for short-term operation is also severely limited. An example of such components plugged into the field device is a radio module or radio adapter for wireless data transmission.

In order to be able to guarantee a permanent operation of such a radio module, the radio modules are adapted to the field devices in such a way that they never exceed a maximum allocated power requirement, wherein the power requirement is thereby matched to a minimum power supplied to the field device. This does have the advantage that the radio module can safely transmit data wirelessly at any time. However, it is disadvantageous that the data are transmitted wirelessly at a comparatively low transmission speed in order to correspondingly save power.

SUMMARY

It is thus an object of the invention to adapt a radio module to a field device in such a way that the radio module can be operated permanently safely and also can transmit the data wirelessly at the highest possible transmission speed.

This object is achieved according to the invention by the system of automation technology according to claim 1, by the plug-in radio module according to claim 3 and by the method according to claim 11.

The system of automation technology according to the invention comprises:
 a field device with a field-device electronics unit having a terminal for connecting a two-wire line and a wired field-device interface, wherein the field device is provided with at least a minimum operating power via the two-wire line that can be connected to the terminal;
 a plug-in radio module of automation technology for wireless data transmission at least comprising a wired interface for connection to the field-device interface of the field device, and radio module electronics with a radio antenna, wherein the radio module electronics is configured to request via the wired interfaces at least one current value of the field device and on the basis of the current value to correspondingly adjust a radio interval and/or a radio data width for wireless data transmission, so that the radio module electronics implements a power-matched operating mode, in which wireless data transmission is adapted to the power currently provided to the field device.

An advantageous embodiment of the system according to the invention further comprises a mobile operating unit, which is configured for wireless data transmission with the radio module.

The plug-in radio module according to the invention of automation technology for wireless data transmission device comprises at least one wired interface for connecting to a corresponding wired field-device interface of a field device, and radio module electronics with a radio antenna, wherein the radio module electronics is configured to request via the wired interfaces at least one current value of the field device and on the basis of the current value to correspondingly adjust a radio interval and/or a radio data width for wireless data transmission, so that the radio module electronics implements a power-matched operating mode, in which wireless data transmission is adapted to the power currently provided to the field device.

An advantageous development of the radio module or of the system provides that the radio module electronics is further designed to implement a standard operating mode, in which the radio interval and/or the radio data width for wireless data transmission is adjusted to a minimum operating power that is at least made available to the field device.

An advantageous development of the radio module or of the system provides that the radio module electronics is also configured to switch back and forth between the standard operating mode and the power-matched operating mode, wherein the switchover from the standard operating mode to the power-matched mode is triggered in particular by an external action of an operator. In particular, the development can provide that the external action comprises a request to the radio module for the wireless data transmission of an envelope of the field device.

An advantageous embodiment of the radio module or of the system provides that for adjusting the radio interval and/or the radio data width the radio module electronics accesses a table or a mathematical function which maps a power possible for the radio module for different current values, wherein the radio module electronics is also configured to adjust the radio interval and/or the radio data width to a power for the requested current value obtained from the table or via the mathematical function.

An advantageous development of the radio module or of the system provides that the radio module electronics is further configured to interrogate via the wired interfaces a terminal voltage which is applied to a terminal of the field device and to adjust the radio interval and/or the radio data width for wireless data transmission on the basis of the interrogated current value and the terminal voltage.

An advantageous development of the radio module or of the system provides that the table or the mathematical function maps the possible power as a function of the different current values and of the terminal voltages corresponding thereto.

An advantageous development of the radio module or of the system provides that the radio module electronics is further configured to carry out wireless data transmission in accordance with one of the following standards or protocols or a modified variant thereof:

Bluetooth or Bluetooth Low Energy;
6 LoWPAN;
6TiSCH; or
Wireless HART.

The invention further relates to a method for wireless data transmission, in particular the wireless transmission of the data of an envelope of a field device, between a mobile operating unit and a radio module plugged into the field device according to one of the previously described developments, comprising at least the following steps:

requesting the current value via the wired interface at a field-device electronics unit of the field device by the radio module electronics;
adjusting the radio interval and/or the radio data width of the radio module to at least the requested current value of the field device;
wireless transmission of data, in particular the data of the envelope of the field device, between the radio module and the mobile operating unit, doing so with the adjusted radio interval and/or the radio data width.

All portable computing units with a radio interface for wireless data transmission come into consideration here as the operating unit. Examples of operating units are cell phones or smartphones, notebooks or even tablets.

An advantageous embodiment of the method according to the invention provides that the radio module electronics also interrogates the terminal voltage which is applied to the terminal of the field device, and wherein the radio module electronics adjusts the radio interval and/or the radio data width for wireless data transmission on the basis of the interrogated current value and the terminal voltage.

An advantageous embodiment of the method according to the invention provides that the radio module electronics also switches back and forth between the standard operating mode and the power-matched operating mode, wherein the switchover from the standard operating mode to the power-matched mode is triggered by an external action executed at the mobile operating unit, in particular a request for transmitting an envelope, by an operator.

BRIEF DESCRIPTION OF THE DRAWINGS

The invention is explained in more detail based upon the following drawing. The following is shown:

FIG. 1 shows a schematic representation of a system of automation technology according to the present disclosure.

DETAILED DESCRIPTION

FIG. 1 shows a schematic representation of a system of automation technology according to the invention. The system has a two-wire field device 1 which comprises a preferably metallic housing 2, in which a field-device electronics unit 4 is arranged. The field-device electronics unit 4 is designed in such a way as to have connection terminals 13 via which a two-wire line 12 is or can be electrically connected. Via the two-wire line 12, the field-device electronics unit 4 and thus the field device 1 are connected to a higher-level unit, not shown separately in FIG. 1, in order to communicate data wirelessly with the higher-level unit. Thereby, the measured values as a main process variable are communicated analogously via the two-wire line 12 in the form of a 4-20 mA current signal in that a corresponding current value of the 4-20 mA current signal is set by the field-device electronics unit. Other data, which may include, for example, parameters of the field device, are transmitted in the form of a digital two-wire signal, for example, for example in accordance with the HART standard. Furthermore, the field-device electronics unit 4 is also supplied with energy via the two-wire line or the 4-20 mA current signal. For this purpose, operating power is made available to the field-device electronics unit as a function of a terminal voltage Uk, which is applied to the terminals, and the 4-20 mA current signal. The terminal voltage Uk usually has a minimum voltage value of approximately 10 V, so that a minimum operating power for the field-device electronics unit of Lmin=10V*4 mA=40 mW results. However, the terminal voltage can in principle also have a value deviating therefrom, for example a value from the range of 10-30 V.

In order to ensure the safe operation of the field device 1, the field-device electronics unit 4 is designed in such a way that the field-device electronics unit can perform all functions, in particular the acquisition or setting of measured values, the processing thereof and the transmission or setting of a corresponding current value of the 4-20 mA current signal by means of the minimum operating power Pmin. Furthermore, the field-device electronics unit 4 is configured in such a way that a part of the minimum operating power is permanently available for an externally connectable radio module 6 or this part is, so to say, "reserved" for the radio module. This part that is provided of the minimum operating power serves to operate the radio module permanently at a minimum radio module operating power.

The system further comprises a radio module 6 for wireless data transmission having a radio module electronics 8 and a wired interface 7. Via the wired interface 7, the radio module 6 is for wired communication releasably connected to a field-device interface 5 of the field device 1 in a data-conducting manner.

The radio module 6 has a radio antenna 9, wherein the radio module electronics 8 is configured to convert the data coming from the field-device electronics unit 4 via the wired interface 5 into data corresponding to wireless transmission, which data can then be transmitted via the radio antenna 9 and vice versa.

According to the invention, the radio module electronics 8 is designed to implement a power-matched operating mode, in which a radio interval 3a and/or a radio data width 3b is adapted to the power P currently made available to the field device 1 by the two-wire line 12, so that the radio module can be operated at least briefly with a power above the necessary minimum radio module operating power. For this purpose, the radio module electronics 8 is configured to interrogate via the wired interfaces 5, 7 at least the current value I currently set in the field device electronics unit 4 and on the basis of at least the current value I to determine a maximum possible power currently available for the radio module, so that the radio interval 3a and/or the radio data width 3b can be adjusted accordingly. The power-matched operating mode can be designed in such a way that the procedure for adjusting the radio interval 3a and/or the radio data width 3b is carried out at regular intervals by the radio module electronics 8, so that the adjustment of the radio interval 3a and/or the radio data width 3b to the power P currently available to the field device 1 takes place dynamically. It goes without saying that, in the event of the radio interval and/or the radio data width being increased due to the additional power available, the wired communication will be correspondingly adjusted via the wired interface 7 for communication of the data which are to be transmitted wirelessly.

In the present case, the radio interval 3a is to be understood as the interval between two active transmission or reception actions of the radio module 6 and the radio data width 3b understood as the number of radio packets which are transmitted per transmission or reception action.

Depending on the type of radio technology used, the radio interval or the radio data width is designated differently. For example, in the case of Bluetooth Low Energy, the radio interval is referred to as the "connection interval" and the radio data width as "packets per connection event".

In order to determine the power available for the radio module 6, a memory 15 of the radio module electronics can have a table, in which specific power values are stored for specific current values. In addition or alternatively, a mathematical function describing the relationship between the current value I and the power may be stored. In addition to interrogating the current value I, the radio module electronics 6 can also be configured to interrogate the value of the terminal voltage UK in the field-device electronics unit via the wired interfaces 5, 7, so as to enable a more precise determination of the power available to the radio module. It goes without saying that in this case the stored table or the mathematical function is expanded by corresponding terminal voltage values Uk.

In addition to the power-matched operating mode, the radio module electronics 8 can also be configured to implement a standard operating mode, in which the radio interval 3a and/or radio data width 3b is matched to the minimum operating power Pmin made available to the field device 1. In addition, the radio module electronics 8 may be configured to switch between the standard operating mode and the power-matched operating mode. The switchover can be initiated here by triggering a specific action, for example the request to transmit a larger amount of data. Such an action can include, for example, the request to transmit an envelope 14 from the field device 1 to a mobile operating unit 10 by an operator 11. Alternatively or in addition, however, the external action may also include the request for a general function, such as loading or storing a configuration of the field device (parametrization), loading an event logbook, or similar functions.

In this case, the request for transmitting the data can be executed by the operator 11 at the mobile operating unit 10 by, for example, inputting a corresponding command.

The invention claimed is:

1. A system of automation technology, comprising:
   a field device including a field-device electronics unit that has a terminal for connecting a two-wire line and a wired field-device interface, wherein at least a minimum operating power is made available to the field device via the two-wire line which can be connected to the terminal;
   a plug-in radio module of automation technology for wireless data transmission, including:
      a wired interface for connection to the field-device interface of the field device, and
      a radio module electronics with a radio antenna, wherein the radio module electronics is configured to request at least one current value of the field device via the wired interface and the field-device interface and on the basis of the at least one current value to correspondingly adjust a radio interval and/or a radio data width for wireless data transmission so that the radio module electronics implements a power-matched operating mode in which the wireless data transmission is adapted to the power currently being provided to the field device.

2. The system according to claim 1, further comprising:
   a mobile operating unit which is configured for wireless data transmission with the radio module.

3. A plug-in radio module of automation technology for wireless data transmission, comprising:
   a wired interface for connection to a corresponding wired field-device interface of a field device; and
   a radio module electronics with a radio antenna,
   wherein the radio module electronics is configured to request at least one current value of the field device via the wired interface and the field device interface and on the basis of the at least one current value to correspondingly adjust a radio interval and/or a radio data width for the wireless data transmission so that the radio module electronics implements a power-matched operating mode in which the wireless data transmission is adapted to the power currently being provided to the field device.

4. The plug-in radio module according to claim 3, wherein the radio module electronics is further configured to implement a standard operating mode in which the radio interval and/or the radio data width for wireless data transmission is adjusted to a minimum operating power which is at least made available to the field device.

5. The plug-in radio module according to claim 4, wherein the radio module electronics is further configured to switch back and forth between the standard operating mode and the power-matched operating mode, wherein the switchover from a standard operating mode to the power-matched mode is triggered by an external action of an operator.

6. The plug-in radio module according to claim 5, wherein the external action includes a request to the radio module for wireless data transmission of an envelope of the field device.

7. The plug-in radio module according to claim 3, wherein for adjusting the radio interval and/or the radio data width, the radio module electronics accesses a table or a mathematical function which maps a power that is possible for the radio module for different current values, wherein the radio module electronics is further configured to adjust the radio interval and/or the radio data width to a power obtained from the table or via the mathematical function for the requested current value.

8. The plug-in radio module according to claim 7, wherein the table or mathematical function maps the possible power as a function of the different current values and terminal voltages corresponding thereto.

9. The plug-in radio module according to claim 3, wherein the radio module electronics is further configured to interrogate via the wired interface and the field-device interface a terminal voltage that is applied to a terminal of the field device and to adjust the radio interval and/or the radio data width for wireless data transmission on the basis of the at least one current value and the terminal voltage.

10. The plug-in radio module according to claim 3, wherein the radio module electronics is further configured to execute wireless data transmission in accordance with one of the following standards or protocols or a modified variant thereof:
   Bluetooth or Bluetooth Low Energy;
   6 LoWPAN;
   6TiSCH; or
   Wireless HART.

11. A method for wireless data transmission between a mobile operating unit and a plug-in radio module, which is plugged into a field device,
   wherein the field device includes a field-device electronics unit that has a terminal for connecting a two-wire line and a wired field-device interface, wherein at least a minimum operating power is made available to the field device via the two-wire line which can be connected to the terminal,
   wherein the plug-in radio module includes a wired interface for connection to the field-device interface of the field device and a radio module electronics with a radio antenna, wherein the radio module electronics is configured to request at least one current value of the field device via the wired interface and the field-device interface and on the basis of the current value to correspondingly adjust a radio interval and/or a radio data width for wireless data transmission so that the radio module electronics implements a power-matched operating mode in which the wireless data transmission is adapted to the power currently being provided to the field device,
   the method comprising:
   requesting the at least one current value via the wired interface at the field-device electronics unit of the field device by the radio module electronics;
   adjusting the radio interval and/or the radio data width of the radio module to at least the requested current value of the field device;
   transmitting wirelessly data between the radio module and the mobile operating unit, doing so with the adjusted radio interval and/or the radio data width.

12. The method according to claim 11, further comprising:
   interrogating with the radio module electronics the terminal voltage applied to the terminal of the field device, and
   adjusting with the radio module electronics the radio interval and/or the radio data width for the wireless data transmission on the basis of the interrogated current value and the terminal voltage.

13. The method according to claim 12, further comprising:
   switching back and forth with the radio module electronics between a standard operating mode and the power-matched operating mode, wherein the switchover from the standard operating mode to the power-matched mode is triggered by an external action executed at the mobile operating unit, in particular a request for transmitting an envelope, by an operator.

* * * * *